United States Patent [19]

Novak et al.

[11] 3,998,765
[45] Dec. 21, 1976

[54] METHOD OF PREPARING PHENOLALDEHYDE FOAMED PLASTICS

[76] Inventors: Viktor Alexeevich Novak, Suzdalskoe shosse, 15a, kv. 29; Jury Semenovich Murashov, ulitsa Mira, 92, kv. 16; Vasily Dmitrievich Valgin, ulitsa Truda, 18, kv. 4; Vsevolod Vasilievich Baranov, ulitsa Mira, 92, kv. 9, all of Vladimir, U.S.S.R.

[22] Filed: Oct. 3, 1974

[21] Appl. No.: 511,650

[30] Foreign Application Priority Data

Oct. 8, 1973   U.S.S.R. ............................ 1965061

[52] U.S. Cl. ............................ 260/2.5 F; 260/49; 260/57 A; 260/72 R; 260/838
[51] Int. Cl.$^2$ ........................................ C08J 9/28
[58] Field of Search ....................... 260/2.5 F, 838

[56] References Cited

UNITED STATES PATENTS

| 2,089,813 | 8/1937 | Rice .............................. 260/2.5 F |
| 3,813,356 | 5/1974 | Lievremont et al. ............ 260/2.5 F |
| 3,830,894 | 8/1974 | Juenger et al. .................. 260/2.5 F |
| 3,872,033 | 3/1975 | Boden et al. .................... 260/2.5 F |

FOREIGN PATENTS OR APPLICATIONS 1,090,741   11/1967   United Kingdom .............. 260/2.5 F

OTHER PUBLICATIONS

Hackh's Chem. Dict., McGraw–Hill Book Co., New York, 4ed., 1969.

*Primary Examiner*—Morton Foelak
*Attorney, Agent, or Firm*—Fleit & Jacobson

[57] ABSTRACT

A method of preparing a phenolaldehyde foamed plastic which involves mixing (1) a phenolaldehyde oligomer, such as a resol-type resin, or a mixture of such a resol-type resin with a novolac-type resin, (2) an acidic catalyst, such as an oligomeric product obtained by the treatment of an aromatic sulphoacid with formaldehyde, or an oligomeric product obtained by the treatment of an aromatic sulphoacid with formaldehyde and a nitrogen-containing compound, such as urea, aniline, and 4.4-diaminodiphenolmethane, (3) a compound of a complex-forming metal, such as cobalt, magnesium, manganese, vanadium, chromium, nickel, copper, iron, titanium, and lead, in the form of its oxide, hydroxide, salt, or mixtures thereof, (4) a surfactant, and (5) a foaming agent. The resulting mixture is foamed and cured at a temperature up to 100° C. Introduction of the complex-forming metal insures improved water-resistance of the resulting foamed plastic.

7 Claims, No Drawings

METHOD OF PREPARING PHENOLALDEHYDE FOAMED PLASTICS

The present invention relates to methods of preparing phenolaldehyde foamed plastics and, more specifically, to methods of preparing foamed phenolaldehyde oligomers cured by means of an acidic catalyst containing sulpho groups in the aromatic ring.

Well known in the art are methods of preparing phenolaldehyde foamed plastics which comprise mixing of phenolaldehyde oligomers, low-boiling foaming agents, auxiliary (modifying) additives, and sulpho-acid catalysts of a different nature. (Cf. British Pats. Nos. 1,228,857; 1,272,857 and 1,283,113; U.S. Pats. Nos. 2,446,429 and 2,744,875; French Pats. Nos. 1,582,096; and 2,148,099).

Phenolaldehyde foamed plastics prepared by these prior art methods feature a reduced anti-corrosion action with respect to metals but have a relatively high water- and moisture-absorption due to the presence of sulpho groups of a hydrophylic nature in their structure.

It is an object of the present invention to prepare phenolaldehyde foamed plastics cured with sulpho-acid catalysts and having an improved water- and moisture-resistance.

This object is accomplished, in accordance with the present invention, by the provision of a method of preparing phenolaldehyde foamed plastics which comprises mixing a phenolaldehyde oligomer, a low-boiling foaming agent, an acidic catalyst containing sulpho groups in the aromatic ring, and auxiliary additives (surface-active agents, fillers, and the like), followed by foaming and curing the resulting mixture without heat supply from the outside or upon moderate heating; in doing so, according to the present invention, as an auxiliary additive improving water-resistance of a foamed plastic, use is made of compounds of complex-forming metals in the form of their oxides, hydroxides, salts or mixtures thereof, these compounds of complex-forming metals being employed in an amount ranging from 5 to 100%, preferably from 20 to 60% by weight of the acidic catalyst containing sulpho groups in the aromatic ring.

The term "phenolaldehyde oligomers" as used includes liquid water-soluble or aquo-emulsion resol-type resins comprising primary condensation products of an (molar) excess of formaldehyde with phenol in the presence of a base, or a mixture of said resins with liquid phenolaldehyde novolac-type condensation products. The latter are prepared by condensation of an excessive amount of phenol with formaldehyde in an acidic medium. Phenolaldehyde oligomers employed in accordance with the present invention contain 5 to 50% by weight of water and have a viscosity within the range of from 500 to 50,000 centipoises (Happler, at 25° C). The resol- and novolac-type resins in the phenolaldehyde oligomers employed in accordance with the present invention are taken in a weight proportion of 100–15 parts by weight (for the resol-type resins) and 0–85 parts by weight (for the novolac-type resins).

As a low-boiling foaming agent in accordance with the method of the present invention use is made of aliphatic hydrocarbons and halogenated derivatives thereof, preferably petroleum ether and chlorofluoroalkanes boiling within the range of from 10° to 80° C.

As conventional acidic catalysts containing sulpho groups in the aromatic ring use may be made of the following compounds:

a. aromatic sulpho-acids such as phenol- tolyene-, benzene- and naphthalene- sulpho-acids or sulphuration products of phenol, benzene, toluene and naphthalene by conventional sulphurating agents;

b. oligomeric products resulting from the treatment of aromatic sulpho-acids with carbonyl-containing compounds such as formaldehyde; such treatment may be performed in the presence of a nitrogen-containing compound selected from the group consisting of an amine, an amide, and a nitrile (such as urea, aniline and the like) and;

c. sulphurated phenolaldehyde novolac-type resins containing at least 0.2 sulpho group per one phenol ring.

Reduced water- and moisture- absorption of phenolaldehyde foamed plastics is ensured, in accordance with the present invention, by the use of a compound of a complex-forming metal in the form of its oxide, hydroxide, salt, or mixtures thereof. These compounds are exemplified by iron and magnesium hydroxides; copper and titanium oxides; nitrates, sulphates, phosphates, chlorides, carbonates, oxalates, adipates and oleates of magnesium, cobalt, lead, chromium, nickel, vanadium; a manganese salt of acidic methylate of ortho-phthalic acid and the like.

These compounds of complex-forming metals are employed, in accordance with the present invention, in an amount ranging from 5 to 100%, preferably from 20 to 60% by weight of the acidic catalyst containing sulpho groups in the aromatic ring.

Exact amount of these compounds required for accomplishing the object of the present invention is determined empirically or calculated on the basis of a specific share of the complex-forming metal cation in the compound employed, foaming and curing conditions for the composition resulting from the stage of intermixing its components.

Optimal results are obtained when a ratio between the number of sulpho groups in the acidic catalyst and number of complex-forming metal atoms in the composition to be foamed ranges from 2:1 to 6:1 respectively.

The highest efficiency of the method according to the present invention, is achieved under such conditions where the complex-forming metal compound:

a. can react, to a sufficient extent, with sulpho groups of the acidic catalyst prior to the moment of a complete curing of the foamed phenolaldehyde oligomer;

b. is dissociated, to a sufficient extent, into ions in the composition to be foamed;

c. is uniformly distributed within the composition to be foamed during the preparation and moulding of the foamed plastic.

These conditions, in turn, are achieved where:

a. the duration of foaming and curing of the starting composition is within the range of from 0.5 to 30 minutes;

b. the complex-forming metal compound is used in the form of a finely-divided powder with a minimal possible particle size; and c. the viscosity (at 20° C) of the starting composition to be foamed ranges from 500 to 10,000 centipoises.

Depending on the dispersity state and chemical nature of the complex-forming metal compound, it is introduced in advance into either a phenolaldehyde oligomer or into the employed acidic catalyst containing sulpho groups prior to the mixing thereof with the other components of the mixture. It is also possible to introduce compounds of the complex-forming metal directly into the mixture of all the remaining components.

In the practice of the present invention, 100 parts by weight of the phenolaldehyde oligomer, 1–30 parts by weight of the low-boiling foaming agent, 0.5–5 parts by weight of a non-ionic surface-active agent (a surfactant), 10 to 50 parts by weight of the acidic catalyst containing sulpho-groups in the aromatic ring, and 0.5 to 50 parts by weight of the complex-forming metal compound are mixed. These extreme proportions of the components cannot be overranged, since it is inexpedient from both economic considerations and requirements as to the quality of the final foamed plastics. The resulting mixture of the above-mentioned components is then poured into a mould or directly into a cavity of an article (structure) where it is foamed and cured for several minutes. By selecting special formulations, it is possible to prepare highly active mixtures which may be processed into a foamed plastic by way of spraying onto vertical and shaped surfaces.

As a rule, for foaming and curing of a mixture the heat evolved during the exothermal reaction of catalytical curing of a phenolaldehyde oligomer is sufficient, and only in some cases such as foaming in metallic moulds with a high heat capacity, is it necessary to effect an additional heating of the moulding cavity to a temperature within the range of from 30° to 80° C.

The method of the present invention makes it possible to produce foamed plastics with a reduced water absorption over correspondingly foamed plastics produced according to prior art methods. Thus, a foamed plastic in the form of a cube with dimensions of 30×30×30 m., prepared according to prior art methods, when maintained in distilled water for 24 hours has a water and moisture absorption of 1–3 kg/m², whereas a foamed plastic prepared by the method of the present invention has a water absorption of 0.05–0.4 kg/m² and a moisture absorption of 3–8%. The method of the present invention also makes it possible to prepare foamed plastics with an attractive colour thus providing opportunities for the production of coloured foamed plastics with an attractive appearance.

Another advantage of the method according to the present invention is the ensuring of a uniform foaming rate, whereby the foamed plastic structure is improved and pressure onto the mould walls is decreased.

It should be noted that none of the above-mentioned advantages can be achieved in the case of using foamable phenolaldehyde mixtures incorporating, in addition to said acidic catalysts, sulphuric acid, hydrochloric acid, nitric acid, benzenesulphochloride and the like. The use of compounds of metals which are not capable of forming complexes such as compounds of sodium, potassium, calcium, barium and the like revealed no advantages either.

The present invention is further illustrated by the following specific Examples.

EXAMPLE 1

To prepare a foamed plastic, the components shown in the following Table were mixed in the proportions specified therein. The mixture was formed and cured at room temperature (21° C), the resulting foamed plastic properties also being given in said Table.

As it is seen from the data shown in this Table, introduction of even a minor amount of iron oxide substantially lowers a water-absorption value of the resulting foamed plastics.

Table

| Component | Experiment No. | | | | | | | | |
|---|---|---|---|---|---|---|---|---|---|
| | 1 | 2 | 3 | 4 | 5 | 6 | 7 | 8 | 9 |
| | Component amount, parts by weight | | | | | | | | |
| Phenolformaldehyde oligomer, resol-type, (viscosity at 20° C is 4270 cpoises, solids content 81.2%) | 100.0 | 100.0 | 100.0 | 100.0 | 100.0 | 100.0 | 100.0 | 100.0 | 100.0 |
| In-ring sulphurated phenol-formaldehyde resin, novolac-type, (viscosity at 20° C is 3,850 cpoises, water content 7.3%) | 30.5 | 30.5 | 30.5 | 30.5 | 30.5 | 30.5 | 30.5 | 30.5 | 30.5 |
| Petroleum ether (fraction boiling at 40–70° C) | 8.1 | 8.1 | 8.1 | 8.1 | 8.1 | 8.1 | 8.1 | 8.1 | 8.1 |
| Iron oxide | & — | 1.8 | 2.9 | 6.2 | 9.3 | 14.6 | 19.8 | 25.2 | 30.4 |
| Foamed plastic properties | | | | | | | | | |
| Water absorption for 24 hours, kg/m² | 2.8 | 1.5 | 1.1 | 0.5 | 0.3 | 0.2 | 0.15 | 0.14 | 0.1 |
| acid number, mg KOH/g | 28 | & — | & — | 18 | & — | & — | 10 | & — | 5 |
| colour | brown-red | — | — | | | violet of various shades | | | |

EXAMPLE 2

To prepare a foamed plastic, mixed were 100 parts by weight of a phenolformaldehyde oligomer comprising a mixture of liquid resol and novolac resins in the weight ratio of 7:3 with 5.2 parts by weight of trifluorochloromethane, 5.2 parts by weight of vanadyl sulphate, and 26.0 parts by weight of a catalyst, i.e. a product of a co-condensation of 1 mole of para-phenolsulphoacid with 0.5 mole of urea and 0.4 mole of formaldehyde (as a 37% formalin). After 4.5 minutes a foamed plastic was produced at 20°±2° C which absorbed 0.3 kg of water per one m² during 24 hours. Foamed plastics prepared with the use of 4.9 to 5.7 parts by weight of nickel nitrate, $Fe(NH_4)(SO_4)_2$, manganese sulphate or magnesium sulphate, $CoCl_3$, $PbCO_3$, $PbC_2O_4$, chromium acetate, lead oleate instead of vanadyl sulphate have similar water absorption properties.

EXAMPLE 3

A foamed plastic was prepared by foaming and curing of a mixture containing 100.0 parts by weight of a resol-type phenol-formaldehyde oligomer (viscosity at 20° C is 7,680 cpoises, solids content 78.3%), 5.0 parts by weight of petroleum ether (boiling temperature 40°–70° C), 11.6 parts by weight of chromium acetate and 34.5 parts by weight of a catalyst, i.e. a product of the treatment of 1 mole of paraphenolsulphonic acid with 0.5 mole of formaldehyde. The resulting foamed plastic has a water absorption (for 24 hours) of about 0.2 kg/m$^3$ and a moisture absorption (for 24 hours) of 6%. After a prolonged (15 days) residence in water the foamed plastic had a water absorption by 5–7 times less than that of a foamed plastic prepared under the same conditions but without using chromium acetate.

EXAMPLE 4

A foamable mixture had the following formula parts by weight:

| | |
|---|---|
| phenolformaldehyde oligomer of Example 1 | 100.0 |
| trifluorochloromethane | 10.2 |
| addition product of ethylene oxide to alkylphenols (a surface-active agent, trade mark OP-7) | 2.4 |
| manganese salt of acidic methylate of orthophthalic acid | 20.0 |
| product of a co-condensation of para-phenolsulphonic acid, 4,4'-diaminodiphenolmethane, urea and formaldehyde | 30.2 |

The mixture of these components was foamed and cured for 3.5 minutes at the temperature of 55° C to give a foamed plastic with a density of 0.48 g/cm$^3$ having a water-absorption value for 24 hours of at most 0.2 kg/m$^3$.

EXAMPLE 5

A foamed plastic applied by the spraying method was prepared by foaming and "cold" curing a mixture consisting of 100.0 parts by weight of the phenolformaldehyde oligomer of Example 1, 100.0 parts by weight of petroleum ether (boiling temperature 40°–70° C), 40.5 parts by weight of iron hydroxide and 150.1 parts by weight of the in-ring sulphurated phenolformaldehyde resin of Example 1. Water absorption of the resulting sprayed foamed plastic was about 0.5 kg/m$^2$ for 24 hours and moisture absorption was 35%. Without iron hydroxide a foamed plastic of a comparable density was produced but with a water absorption of about 3.1 kg/m$^2$ for 24 hours.

What is claimed is:

1. A method of preparing phenolaldehyde foamed plastics having low water-absorbing properties comprising mixing a phenolaldehyde oligomer consisting of 100–15 parts by weight of a resol resin and 0–85 parts by weight of a novolac resin, with an acidic catalyst selected consisting essentially of (A) an oligomeric product obtained by the treatment of an aromatic sulphoacid with formaldehyde, or (B) an oligomeric product obtained by the treatment of an aromatic sulphoacid with formaldehyde and a nitrogen-containing compound selected from the group consisting of an amine and an amide, a complex-forming metal selected from the group consisting of cobalt, magnesium, manganese, vanadium, chromium, nickel, copper, iron, titanium, and lead and in the form of its oxide, hydroxide, salt, or mixtures thereof, a surfactant and a foaming agent, and then foaming and curing the mixture at a temperature up to 100° C.

2. A method as claimed in claim 1, wherein said complex-forming metal is used in an amount ranging from 5 to 100% by weight of said acidic catalyst.

3. A method as claimed in claim 1, wherein said complex-forming metal is used in an amount ranging from 20 to 60% by weight of said acidic catalyst.

4. A method as claimed in claim 1, wherein said mixture contains 100 parts by weight of phenolaldehyde oligomer, 1 to 30 parts by weight of said foaming agent, 0.5 to 5 parts by weight of said surfactant, 10 to 50 parts by weight of an acidic catalyst and 0.5 to 50 parts by weight of said complex-forming metal.

5. A composition for producing a phenolaldehyde foamed plastic having low water-absorbing properties comprising 100 parts by weight of a phenolaldehyde oligomer consisting of 100–15 parts by weight of a resol resin and 0–85 parts by weight of a novolac resin, 1 to 30 parts by weight of a foaming agent, 0.5 parts to 5 parts by weight of a surfactant, 10 to 50 parts by weight of an acidic catalyst selected consisting essentially of (A) an oligomeric product obtained by the treatment of an aromatic sulphoacid with formaldehyde or (B) an oligomeric product obtained by treatment of an aromatic sulphoacid with formaldehyde and a nitrogen-containing compound selected from the group consisting of an amine and an amide, and 0.5 to 50 parts by weight of a complex-forming metal selected from the group consisting of cobalt, magnesium, manganese, vanadium, chromium, nickel, copper, iron, titanium and lead in the form of its oxide, hydroxide, salt, or mixtures thereof.

6. The process of claim 1 wherein the nitrogen-containing compound is selected from the group consisting of urea, aniline, and 4,4'-diaminodiphenolmethane.

7. The composition of claim 5 wherein the nitrogen-containing compound is selected from the group consisting of urea, aniline, and 4,4'-diaminodiphenolmethane.

* * * * *